Patented Nov. 11, 1924.

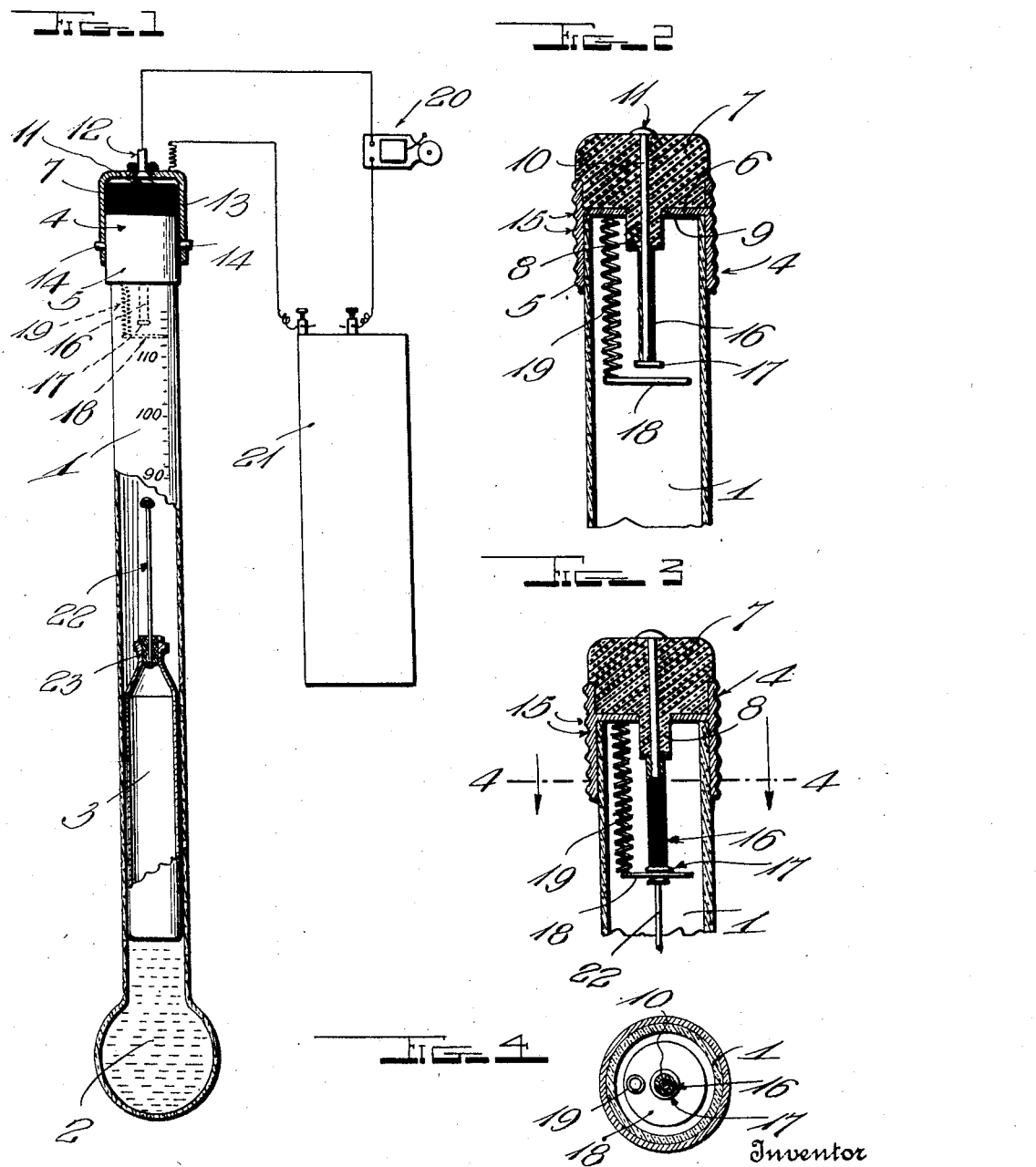

1,515,072

UNITED STATES PATENT OFFICE.

GEORGE O. RUFF, OF PARIS, ILLINOIS.

THERMAL CIRCUIT CLOSER.

Application filed September 11, 1922. Serial No. 587,392.

*To all whom it may concern:*

Be it known that I, GEORGE O. RUFF, a citizen of the United States, residing at Paris, in the county of Edgar and State of Illinois, have invented certain new and useful Improvements in Thermal Circuit Closers; and I do declare the following to be a full, clear, and exact description of the invention, such as will enable other skilled in the art to which it appertains to make and use the same.

My invention relates to improvements in thermal circuit closers and more particularly to those of the type having a vertically movable float which automatically closes an electric circuit when it ascends to a predetermined amount, under the influence of the mercury, alcohol, or other expansible medium within the thermometer tube.

One object of my invention is to provide a thermal circuit closer having an improved simplified arrangement of contacts, the movable contact being mounted in such a manner that it will be extremely sensitive to the touch of the float.

A further object is to provide a cap for the thermometer tube in electrical engagement with one of the contacts but insulated from the other contact which passes therethrough, so that the cap may be inserted in an ordinary electric light or other socket.

Yet another object is to provide the float with a vertically adjustable stem for forcing the movable contact against the fixed contact, it being readily seen that by adjusting the stem, the circuit closer may be made to operate at any of a plurality of temperatures.

With the foregoing in view, the invention resides in the novel subject matter hereinafter described and claimed, the description being supplemented by the accompanying drawings.

Figure 1 is a side elevation partly in section, showing my invention in connection with a battery operated bell and an ordinary bayonet slot socket.

Figure 2 is an enlarged vertical section through the upper end of the device illustrating however a different form of cap.

Figure 3 is a duplicate of Fig. 2 with the exception that one shows the contacts separated and the other discloses them in engagement with each other.

Figure 4 is a horizontal section on line 4—4 of Fig. 3.

In the drawings above briefly described, the numeral 1 designates a thermometer tube containing any expansible liquid or other medium 2 and a float 3 for operating circuit closing means at the upper end of the tube when it rises to a sufficient extent.

The upper end of the tube 1 is closed by a metallic cap 4 which includes an annular upstanding wall 5 and a horizontal plate 6 secured to said wall below its upper end, forming a cup or pocket at the upper portion of the cap, which is filled with a body of insulating material 7, a portion 8 of which extends through a central opening 9 in the plate 6. A fixed central contact 10 passes through the insulation 7 and the portion 8 thereof and is provided on its other end with a suitable terminal 11 adapted to contact with an appropriate central contact 12 carried by any suitable socket 13, the wall 5 of the cap being adapted to contact with the wall of the socket as shown in Fig. 1, while the contact 12 is of course insulated from the remainder of the socket. Either the laterally projecting pin 14 shown in Fig. 1 for engagement with the bayonet slots of the socket 13, or the screw threads 15 shown in the other views, may be used for securing the cap 4 within the socket and it will be understood that in some instances it is unnecessary to mount the device in any kind of a socket, and in this instance suitable provision would of course be made for electrically connecting a pair of wires to the contact 10 and the wall 5.

The lower end of the contact 10 depends below the insulating portion 8 and is surrounded by an insulated sleeve 16 which is preferably held in place thereon by an appropriate enlargement 17 on the lower end of the contact. A movable contact 18 is spaced a slight distance below the enlargement 17 and this contact is preferably in the form of a circular plate supported by a resilient suspender, such as a delicate coiled spring 19 secured at its lower end to plate 18 in electrical engagement with the latter and similarly secured at its upper end to the plate 6 of the cap 4. By this arrangement, it will be seen that rise of the float 3 will force the contact plate 18 into engagement with the lower end of the central fixed contact 10, thereby completing the circuit, for instance of an electric bell or other alarm 20. In Fig. 1, I have shown this alarm suitably wired with the contact 12, socket 13, and an electric battery 21.

In order that the float 3 may be made to operate the circuit closing means at any of a number of temperatures, I prefer to provide said float with a vertically adjustable upstanding stem 22 whose upper end is intended to strike the plate 18 and force it into contact with the contact 10. This stem is preferably in the form of a short length of stiff wire having its lower end passed through a resilient plug 23 which closes the upper end of the hollow float 3. It will be seen that compression of the plug 23 by insertion into the float, will cause it to tightly grip the stem 22 and hold the latter in any position to which it may be adjusted. Sealing wax or any other desired medium may be employed for normally holding the cap 4 upon the tube 1 but for permitting removal of said cap when the stem 22 is to be adjusted. Furthermore, it will be understood that if desired, all adjustment of the stem 22 may be made at the factory, in which case the cap 4 will be permanently secured upon the tube 1.

The invention is simple and inexpensive, yet is highly efficient and desirable when used in connection with any sort of an electric circuit which is to be closed when a predetermined temperature is reached at a certain point. The uses of the invention are too numerous to set forth but in all cases it will be very effective and well adapted for reliable use.

As excellent results have been obtained from the general construction shown and described, this construction is preferably followed, but within the scope of the invention as claimed, numerous minor changes may of course be made.

I claim:

1. A device of the class described comprising a thermometer tube, a metal sleeve fitted exteriorly upon the open end of said tube and extending beyond said end, a centrally apertured disk disposed transversely across said sleeve intermediate the ends thereof and bearing against the open end of said tube, a body of insulation fitted in the outer end of said tube, a stationary contact pin extending centrally through said body and through the aperture in said disk into the interior of said tube, said pin being provided at its inner end with a fixed contact, a movable contact arranged adjacent said fixed contact, resilient means mounting said movable contact on said disk, said means normally holding said movable contact out of engagement with said fixed contact but permitting it to be pushed into engagement with the latter, and a float disposed in said tube to engage said movable contact and push it into engagement with said fixed contact.

2. A device of the class described comprising a thermometer tube, a metal sleeve fitted exteriorly upon the open end of said tube and extending beyond said end, a centrally apertured disk disposed transversely across said sleeve intermediate the ends thereof and bearing against the open end of said tube, a body of insulation fitted in the outer end of said tube and having a portion extending through the aperture in said disk, a stationary contact pin extending centrally through said body into the interior of said tube, said pin being provided at its inner end with a fixed contact, a coiled spring secured at one end to said disk and extending into said tube beyond the inner end of said pin, a contact plate secured to the other end of said spring, the latter permitting said plate to be moved into and out of engagement with said fixed contact but normally holding said plate out of engagement with said fixed contact, and a float disposed in said tube to engage said plate to push it into engagement with said fixed contact.

In testimony whereof I have hereunto affixed my signature.

GEORGE O. RUFF.